United States Patent [19]
Kletzl

[11] Patent Number: 6,038,112
[45] Date of Patent: Mar. 14, 2000

[54] CASSETTE HAVING AT LEAST ONE AXIALLY MOVABLE REEL AND HAVING BLOCKING MEANS FOR BLOCKING AN AXIAL MOVEMENT OF THE REEL

[75] Inventor: Franz Kletzl, Mank, Austria

[73] Assignee: U.S. Philips Corporation, New York, N.Y.

[21] Appl. No.: 09/054,110

[22] Filed: Apr. 2, 1998

[30] Foreign Application Priority Data

Apr. 3, 1997 [EP] European Pat. Off. ............. 97890061

[51] Int. Cl.⁷ ................................................. G11B 23/087
[52] U.S. Cl. ............................................................. 360/132
[58] Field of Search ........................ 360/132; 242/338.1, 242/348

[56] References Cited

U.S. PATENT DOCUMENTS

| | | | |
|---|---|---|---|
| 5,027,249 | 6/1991 | Johnson et al. | 360/132 |
| 5,052,634 | 10/1991 | Bushwood et al. | 242/198 |
| 5,366,173 | 11/1994 | Lammers et al. | 242/338 |
| 5,813,622 | 9/1998 | Von Alten | 242/348 |

*Primary Examiner*—Robert S. Tupper
*Attorney, Agent, or Firm*—David R. Treacy

[57] ABSTRACT

A cassette having a reel which is movable axially away from the cassette bottom wall to a drive position against the force of a spring. When in a rest position the reel is locked against rotation by a latching device which is arranged completely inside the cassette. A blocking device adjacent the reel hub prevents movement of the reel axially. Upon movement of a reel drive device into the cassette, the blocking device is moved to a release position so that the reel can be moved axially to a drive position in which the latch device is inoperative.

12 Claims, 3 Drawing Sheets

CASSETTE HAVING AT LEAST ONE AXIALLY MOVABLE REEL AND HAVING BLOCKING MEANS FOR BLOCKING AN AXIAL MOVEMENT OF THE REEL

BACKGROUND OF THE INVENTION

The invention relates to a cassette having a box-shaped housing which comprises a bottom wall, an upper wall parallel to the bottom wall, and side walls which connect the bottom wall and the upper wall to one another, and which accommodates at least one reel which comprises a reel hub and at least one reel flange and which is adapted to take up a magnetic tape and which is drivable so as to be rotated about a reel axis which extends perpendicularly to the bottom wall and which is movable in a direction parallel to the reel axis between a rest position, in which latching means, arranged between the reel and the housing, lock the reel against rotation about the reel axis, and a drive position, in which the latching means are inoperative and the reel is drivable by means of a reel drive device with which it can be brought into driving engagement in a direction parallel to the reel axis through a passage provided in the bottom wall, and the reel, in the absence of the reel drive device, can be held in its rest position by means of a spring, which is arranged inside the housing and which urges the reel towards the bottom wall, and which is movable away from the bottom wall by means of the reel drive device from its rest position into its drive position.

Such a cassette of the type defined in the opening paragraph is known, for example, form the document U.S. Pat. No. 5,366,173A. In this known cassette the latching means for latching the reel against rotation are arranged in the area of the reel hub and are formed by a latching tab, which projects from the upper wall of the cassette housing in a direction parallel to the reel axis, and by a latching disc, which is rotationally coupled to the latching tab in a direction transverse to the reel axis and which is movable in a direction parallel to the reel axis between a latching position and a non-latching position. A pressure spring arranged between the upper wall of the cassette housing and the latching disc acts on the latching disc to urge the latching disc towards a reel hub ring, as a result of which—in the absence of a reel drive device in an apparatus adapted to cooperate with the known cassette and an actuating pin for moving the latching disc, which pin extends centrally through the reel drive device—the latching disc is held in its latching position, in which teeth provided on this disc are in mesh with corresponding teeth provided on the reel hub ring, thereby locking the reel against rotation about the reel axis. When the known cassette is loaded into an apparatus adapted to cooperate with the cassette the reel drive device and the actuating pin enter into engagement with the reel and the latching disc, upon which the reel is moved parallel to the reel axis away from the bottom wall of the cassette housing from its rest position into its drive position and the latching disc is moved parallel to the reel axis away from the bottom wall of the cassette housing from its latching position into its non-latching position against the force of the pressure spring. As a result of this, the reel is no longer locked against rotation and the reel can be driven rotationally by means of the reel drive device.

A problem of the known cassette is that the latching disc of the latching means—when the cassette is not in operation and situated outside an apparatus adapted to cooperate with the cassette—is readily and freely accessible through the passage provided to give access for the reel drive device and of the actuating pin, which may comparatively easily lead to an unintentional or inadvertent or inappropriate movement of the latching disc from its latching position into its non-latching position, which may subsequently result in an undesired rotation of the reel, which in its turn may result in the magnetic tape being wound unintentionally off the reel. Particularly when the cassette is subsequently put into operation again, such an unintentional unwinding of the magnetic tape may cause damage to the tape or also damage to parts of an apparatus which cooperate with the magnetic tape, which is obviously undesirable.

SUMMARY OF THE INVENTION

It is an object of the invention to preclude the aforementioned problem and to improve a cassette of the type defined in the opening paragraph and to provide an improved cassette in which an unintentional rotation of the reel is avoided with a comparatively high degree of certainty. According to the invention, in order to achieve this object in a cassette of the type defined in the opening paragraph, the latching means are arranged inside the housing of the cassette at locations which are inaccessible from outside the cassette and blocking means are arranged in the area of the reel hub of the reel, by means of which a movement of the reel in a direction parallel to the reel axis from its rest position into its drive position can be prevented and which are movable by means of an actuating device, namely from a blocking position, in which they prevent a movement of the reel from its rest position into its drive position, into a release position, in which they permit a movement of the reel from its rest position into its drive position. Owing to these measures in accordance with the invention it is achieved in a constructionally very simple as well as economical manner that an unintentional or inadvertent or inappropriate movement or actuation of the latching means is wholly excluded and that by a suitable construction and arrangement of the blocking means an unintentional movement of the reel from its rest position into its drive position and, consequently, an unintentional deactivation of the latching means is excluded in a highly reliable manner.

In a cassette in accordance with the invention having the characteristic features described above, it has proved to be advantageous if, in addition, if the latching means includes at least one tooth projecting from one wall of the housing, and latching teeth on the reel. This has proved to be advantageous in view of a very simple yet effective construction. It is to be noted that, alternatively, the latching means can be formed by two inter-engageable contrate-type toothed elements, of which one toothed element is connected to the bottom wall of the cassette housing and the other toothed element is connected to the reel flange adjacent the bottom wall of the housing or, alternatively, to the reel hub adjacent the bottom wall of the housing. It is alternatively possible to provide latching means which comprise, for example, four latching teeth which each project from a side wall in a direction toward the reel axis and which cooperate with spur teeth provided on the circumference of a reel flange.

In a cassette in accordance with the invention, it has also proved to be advantageous if, in addition, the reel hub has a hollow cylindrical wall defining a space open toward the passage in the bottom wall, and the blocking means is arranged inside this cylindrical wall. This has proved to be advantageous in view of a particularly compact construction. The measures defined in the dependent claim 3 can also be applied advantageously in a cassette in accordance with the invention as defined in the dependent claim 2.

In a cassette in accordance with the invention having the characteristic features defined in the dependent claim 3, it has proved to be advantageous if, in addition, the measures defined in the dependent claim 4 are taken. During practical tests such an embodiment has proved to be particularly advantageous. Further advantageous features of such an embodiment are a high reliability of operation and dependability, the positive characteristics of this embodiment being also maintained after a long period of use.

In a cassette in accordance with the invention having the characteristic features defined in the dependent claim 4, it has proved to be advantageous if, in addition, the measures defined in the dependent claim 5 are taken. Such an embodiment of a cassette in accordance with the invention has the advantage of a particularly high reliability of operation and, moreover, guarantees a simple and reliable positioning of all the blocking levers in their blocking positions.

In a cassette in accordance with the invention having the characteristic features defined in the dependent claim 5, it has proved to be advantageous if, in addition, the measures defined in the dependent claim 6 are taken. Such an embodiment has proved to be particularly advantageous for a reliable movement of the blocking lever from its release position into its blocking position by means of the annular spring.

In a cassette in accordance with the invention having the characteristic features defined in the dependent claim 6, it has proved to be advantageous if, in addition, the measures defined in the dependent claim 7 are taken. Such an embodiment has proved to be particularly advantageous for a reliable movement of the blocking lever from its blocking position into its release position by means of an actuating device in the apparatus.

In a cassette in accordance with the invention having the characteristic features defined in the dependent claim 7, it has proved to be advantageous if, in addition, the measures defined in the dependent claim 8 are taken. In this way, a particularly simple construction is obtained.

In a cassette in accordance with the invention having the characteristic features defined in the dependent claim 4, it has proved to be very advantageous if, in addition, the measures defined in the dependent claim 9 are taken. Such an embodiment has the advantage of a uniform distribution of the force exerted on both the supporting member and the reel hub and thus the entire reel, and further ensures a well-protected mounting of the pressure spring between the supporting member and the reel hub of the reel. The measures defined in the dependent claim 9 can also be applied advantageously to cassettes in accordance with the invention as defined in the dependent claims 5, 6, 7 and 8.

In a cassette in accordance with the invention having the characteristic features defined in the dependent claim 9, it has proved to be very advantageous if, in addition, the measures defined in the dependent claim 10 are taken. This has proved to be very advantageous in view of a compact and simple construction.

In a cassette in accordance with the invention having the characteristic features defined in the dependent claim 1, it has also proved to be very advantageous if, in addition, the measures defined in the dependent claim 11 are taken. In this way, it is achieved that no separate actuating device is needed for moving the blocking means arranged in the reel hub area of the reel, but that the blocking means can be moved by means a part of the reel drive device which must be brought into driving engagement with the reel at any rate. The measures defined in the dependent claim 11 can also be applied advantageously to cassettes in accordance with the invention as defined in the dependent claims 2 to 10.

The above-mentioned as well as further aspects of the invention will become apparent from the embodiment described hereinafter by way of example and will be elucidated by means of this embodiment.

BRIEF DESCRIPTION OF THE DRAWING

The invention will now be described in more detail with reference to the drawings, which show an embodiment to which the invention is not limited.

DESCRIPTION OF THE PREFERRED EMBODIMENTS

Figure 1:
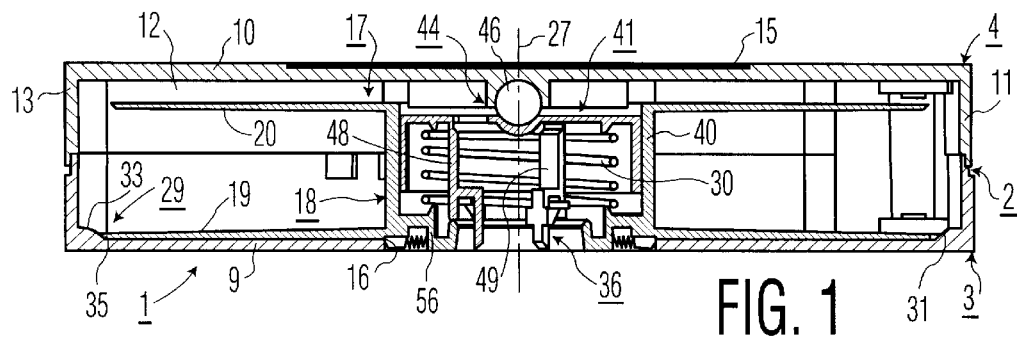
FIG. 1 is a cross-sectional view taken on the line I—I in FIG. 3 and shows a cassette in accordance with a first embodiment of the invention, a reel accommodated in the cassette, which reel is movable in a direction parallel to the reel axis, being in its rest position and blocking means arranged in the area of the reel hub of the reel being in their blocking position.
Figure 2:
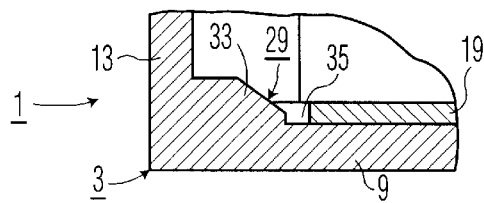
FIG. 2 shows a detail of the cassette of FIG. 1, to an enlarged scale in comparison with FIG. 1, to illustrate the construction of the latching means provided in the cassette.
Figure 3:
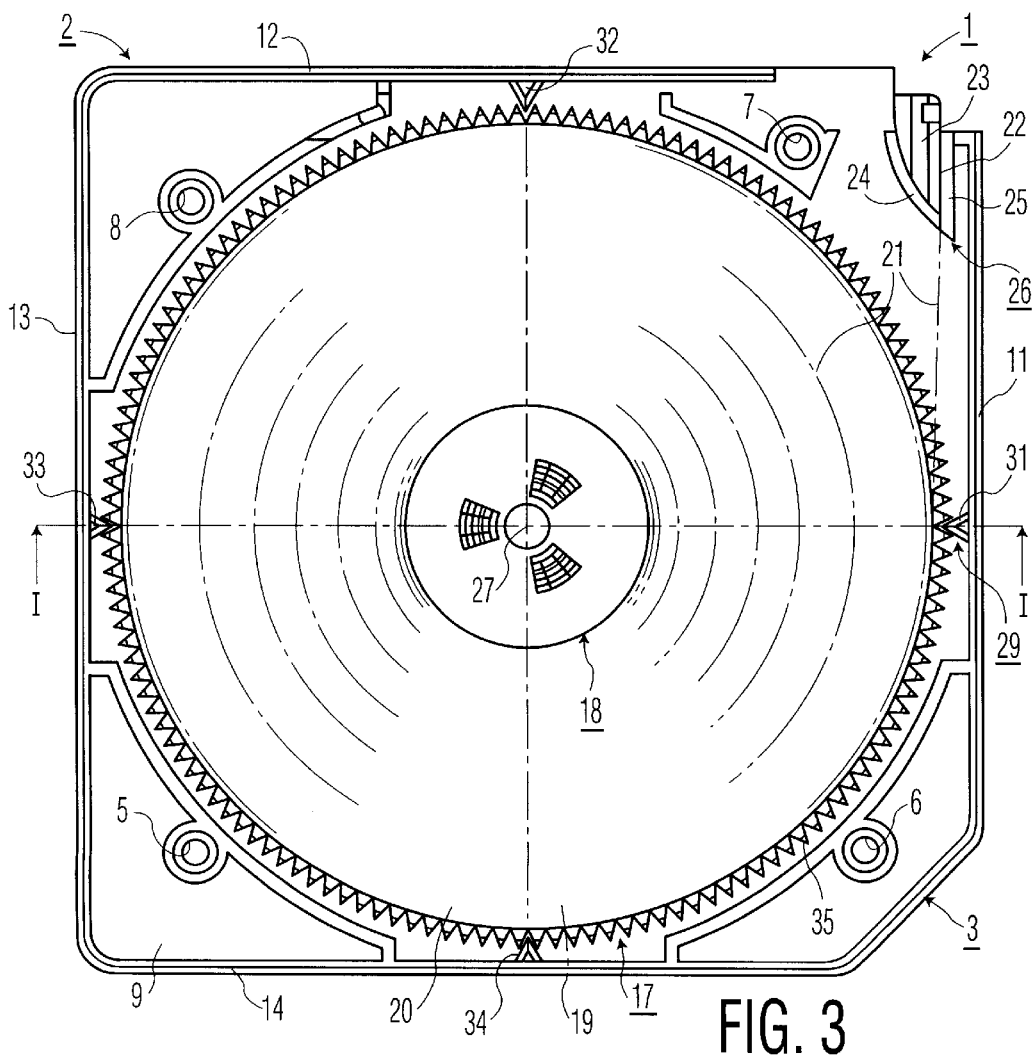
FIG. 3 is a plan view showing a lower housing section of the cassette of FIG. 1 with the parts of this cassette accommodated in the housing section.

FIGS. 1 to 7 show a cassette 1 in accordance with the invention. The cassette has a box-shaped housing comprising a trough-like lower housing section 3 and a similarly trough-like upper housing section 4. The lower housing section 3 and the upper housing section 4 are secured to one another by means of four screws, not shown, which have been passed through four holes 5, 6, 7 and 8 and extend up to the upper housing section 4, into which they have been screwed. By connecting the lower housing section 3 and the upper housing section 4 to one another the box-shaped housing 2 is obtained, which thus comprises a bottom wall 9, an upper wall 10 parallel to the bottom wall 9, and side walls 11, 12, 13 and 14 which connect the bottom wall 9 and the upper wall 10 to one another. The upper wall 10 has a recessed portion which accommodates a label 15 shown only in FIG. 1. The bottom wall 9 has a passage 16 of circular cross-section. The purpose of this passage 16 will be explained hereinafter.

The housing 2 of the cassette 1 accommodates a reel 17. The reel 17 has a reel hub 18, a first reel flange 19 at the side of the bottom wall side and a second reel flange 20 at the side of the upper wall. The reel 17 serves to take up a magnetic tape 21, which is shown only in FIG. 3 in dash-dot lines. The magnetic tape 21 has one end connected to the reel hub 18 in a manner not shown. The magnetic tape 21 has its other end 22 connected to a coupling member 23 which is positioned in a coupling position in a substantially V-shaped positioning wedge 26 formed by two bounding walls 24 and 25 connected to the bottom wall 9 and extending perpendicularly to the bottom wall 9, in which position the coupling member 23 can be coupled to an extraction member of an apparatus adapted to cooperate with the cassette 1, after which the coupling member 23 and, consequently, the magnetic tape 21 can be extracted from the cassette 1 by means of the extraction member, which is movable in the apparatus so as to be brought in particular onto operational contact with a magnetic head for scanning the magnetic tape 21.

The reel 17 is drivable so as to be rotated about a reel axis 27 which extends perpendicularly to the bottom wall 9 and, as a consequence, also perpendicularly to the upper wall 10. The reel 17 can be driven by means of a reel drive device 28 of an apparatus adapted to cooperate with the cassette 1, which device can be brought into driving engagement with the reel 17 through the passage 16 in the bottom wall 9 in a direction parallel to the reel axis 27. Such a reel drive device 28 is shown diagrammatically in FIGS. 4 to 7. FIGS. 4 to 7 only show the part of the reel drive device 28 which cooperates directly with the reel 17 of the cassette 1, because only this part is relevant in the present context. It is to be noted that the reel drive device 28 comprises a drive motor by means of which the part of the reel drive device 28 shown in FIGS. 4 to 7 is rotationally drivable in a controlled manner.

Figure 4:
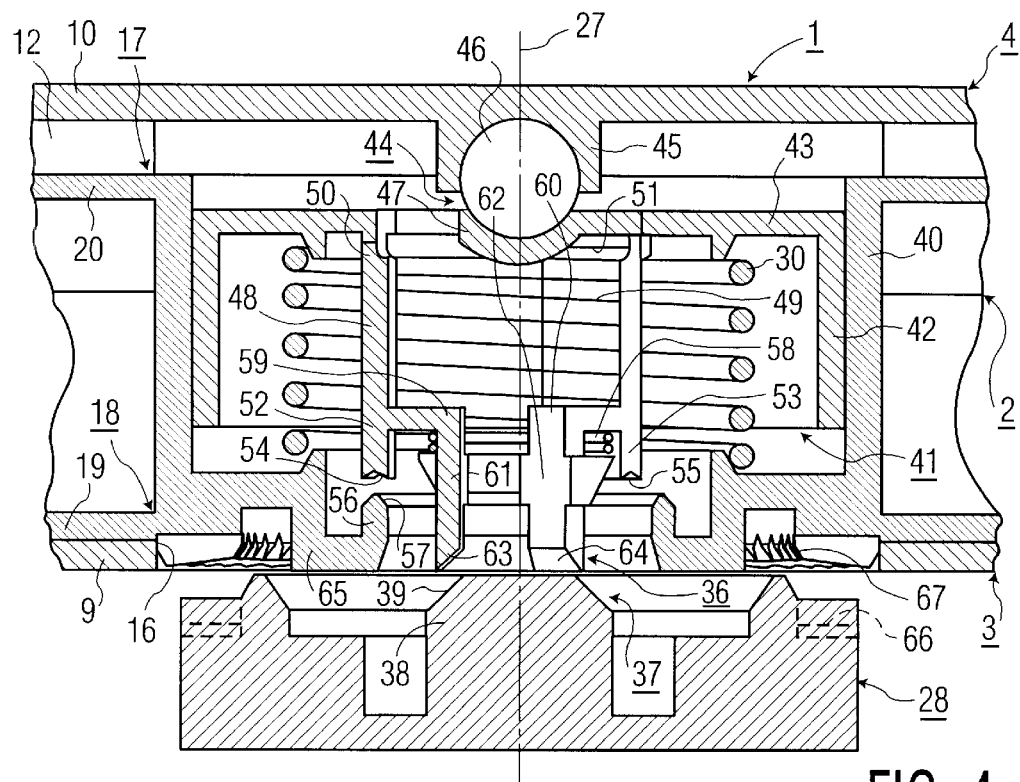
FIG. 4 shows a part of the cassette of FIG. 1 in a manner similar to FIG. 1 but to an enlarged scale in comparison with FIG. 1 and mainly shows the area with the reel hub of the reel, the blocking means arranged in the area of the reel hub being shown in their blocking position.
Figure 7:
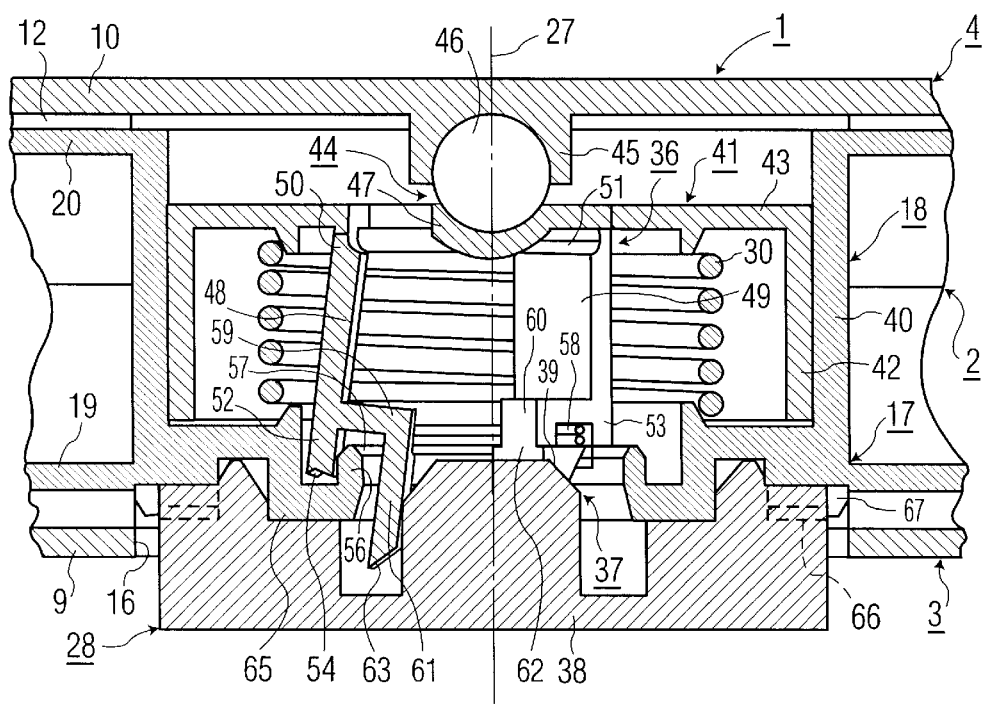
FIG. 7 shows a part of the cassette of FIG. 1 in a manner similar to FIGS. 4, 5 and 6, the blocking means being shown in its release position.

The reel 17 is movable in a direction parallel to the reel axis 27, namely between a rest position shown in FIGS. 1 and 4 and a drive position shown in FIG. 7. In the rest position shown in FIGS. 1 and 4 latching means 29, whose construction is apparent in particular from FIGS. 2 and 3, lock the reel against rotation about the reel axis 27. In the drive position shown in FIG. 7 the latching means 29 are inoperative and the reel 17 is rotationally drivable by means of the reel drive device 28. On the one hand, in the absence of the reel drive device 28, the reel 17 can be held in its rest position shown in FIGS. 1 and 4 by means of a spring 30, which is arranged inside the housing 2 and which urges the reel 17 towards the bottom wall 9, and, on the other hand, it is movable away from the bottom wall 9 by means of the reel drive device 28 from its rest position shown in FIGS. 1 and 4 into its drive position shown in FIG. 7.

In the cassette 1 shown in FIGS. 1 to 7 the latching means 29 are suitably arranged inside the housing 2 of the cassette 1 at locations which are inaccessible from outside the cassette 1. The latching means 29 comprise four wedge-shaped latching teeth 31, 32, 33 and 34, which are each connected to the bottom wall 9 in an area near the bottom wall and a respective one of the side walls 11, 12, 13 and 14 and thus project both from the bottom wall 9 and from the respective one of the side walls 11, 12, 13 and 14, as well as latching teeth 35 provided on the reel 17, in the present case on the first reel flange 19 of the reel 17.

Advantageously, the cassette 1 further comprises blocking means 36 in the area of the reel hub 18 of the reel 17, by means of which a movement of the reel 17 in a direction parallel to the reel axis 27 from its rest position shown in FIGS. 1 and 4 into its drive position shown in FIG. 7 can be prevented. The blocking means 36 are movable by means of an actuating device 37, namely from a blocking position shown in FIGS. 1 and 4, in which they block a movement of the reel 17 from its rest position into its drive position, into a release position shown in FIG. 7, in which they permit a movement of the reel 17 from its rest position into its drive position. In the present cassette 1 the blocking means 36 have such a construction that they are movable with the aid of an actuating device 37, which is formed by a part 38 of the reel drive device 28. As can be seen in FIGS. 4 to 7, the part 38 of the reel drive device 28 is formed by a substantially cylindrical projection of the reel drive device 28, which is at least substantially coaxial with the reel axis 27 and which has a circumferential taper 39 at its free end so as to ensure a smooth and correct cooperation with the blocking means 36.

In the cassette 1 the reel hub 18 of the reel 17 has a hollow cylindrical wall portion 40 from which the two reel flanges 19 and 20 project radially. Inside this hollow cylindrical wall portion 40 of the reel hub 18 the blocking means 36 are arranged, which has proved to be advantageous for a construction which is as compact as possible.

As is apparent particularly from FIGS. 4 to 7, a cup-like bearing member 41 for the reel 17 is arranged inside the hollow cylindrical wall portion 40 of the reel hub 18. The cup-like bearing member 41 has a circumferential cup wall 42 and a cup bottom wall 43. The circumferential cup wall 42 is an accurate fit in the hollow cylindrical wall portion 40 of the reel hub 18. The cup bottom wall 43 is disposed adjacent the upper wall 10 of the housing 2.

A pivotal bearing device 44 for rotatably supporting the reel 17 is interposed between the upper wall 10 of the housing 2 of the cassette 1 and the cup bottom wall 43 of tile bearing member 41. The pivotal bearing device 44 comprises a bearing ball 46 which is non-rotatably mounted in a projection 45 on the upper wall 10 and a bearing socket 47 for the bearing ball 46, which bearing socket is integral with the cup bottom wall 43 of the bearing member 41. The bearing socket 47 is rotatable relative to the bearing ball 46, namely about the reel axis 27. The bearing member 41, which has only comparatively small dimensions, can be made of a comparatively expensive synthetic material having good antifriction properties with respect to the bearing ball 46 in order to achieve satisfactory bearing properties. This has the advantage that the two housing sections 3 and 4, particularly the upper housing section 4, can be made of a comparatively cheap synthetic material because the upper housing section 4 merely serves for non-rotatably holding the bearing ball 46 and need not have a bearing function.

It is to be noted that the hollow cylindrical wall portion 40 of the reel hub 18 is movable with respect to the circumferential cup wall 42 of the bearing member 41 in a direction parallel to the reel axis 27. Such a movement of the hollow cylindrical wall portion 40 with respect to the circumferential cup wall 42 takes place during a movement of the reel 17 between its rest position and its drive position.

Figure 5:
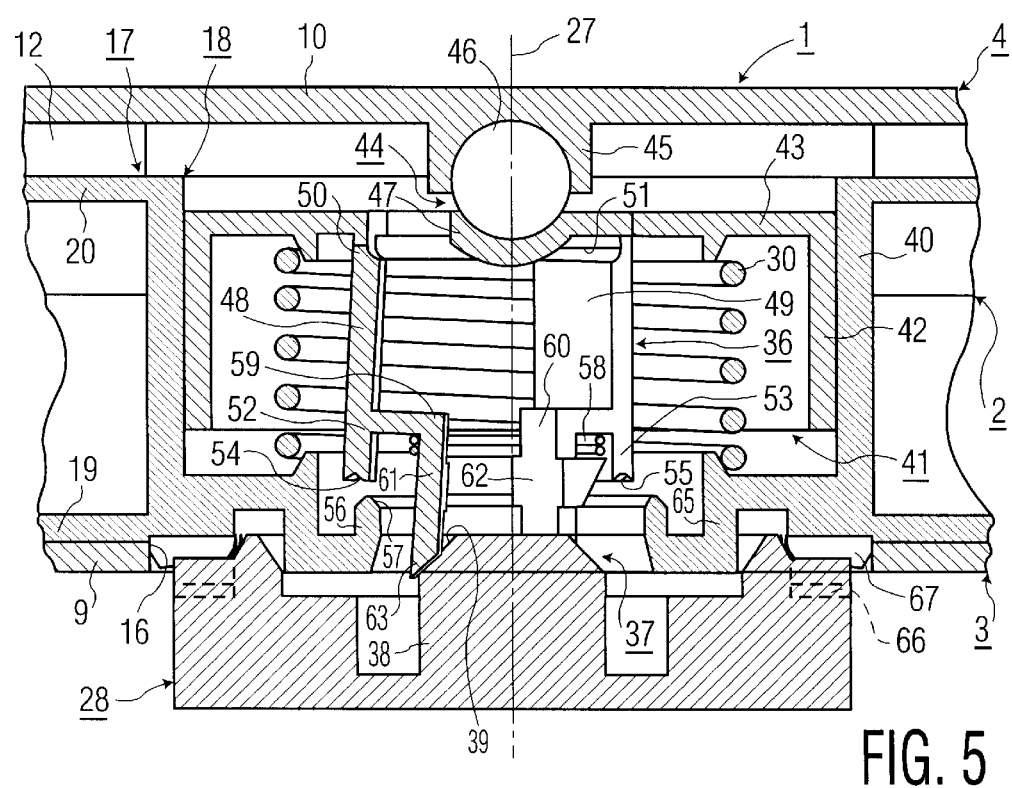
FIG. 5 shows a part of the cassette of FIG. 1 in a manner similar to FIG. 4, the blocking means being shown in a first intermediate position.
Figure 6:
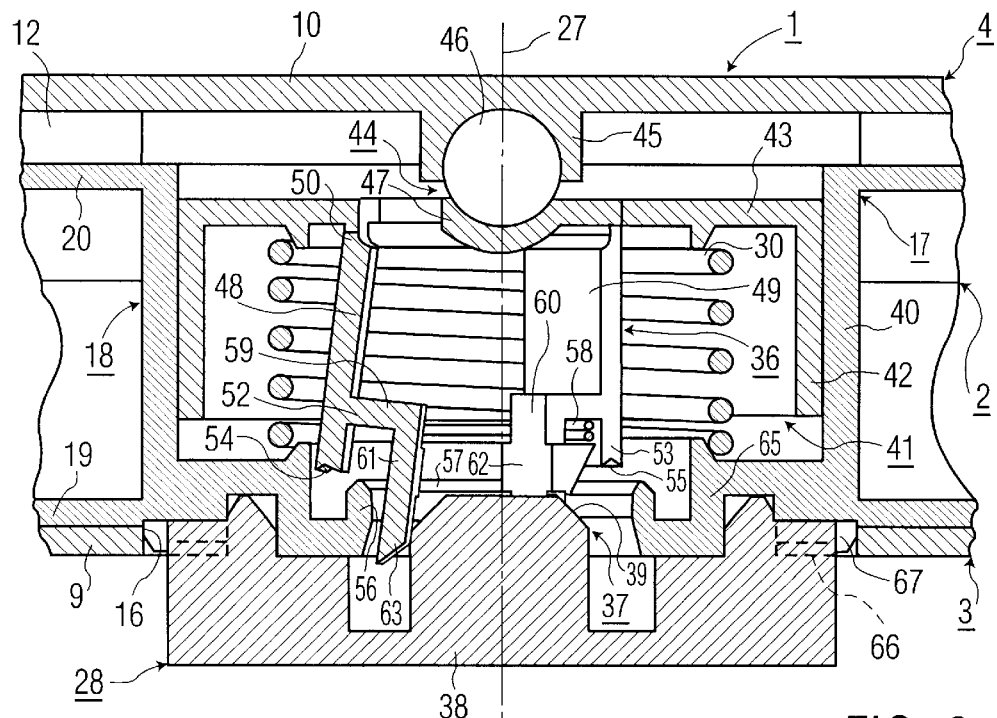
FIG. 6 shows a part of the cassette of FIG. 1 in a manner similar to FIGS. 4 and 5, the blocking means being shown in a second intermediate position.

In the cassette 1 the blocking means 36 advantageously comprise three blocking levers which are pivotally connected to the cup bottom wall 43 of the bearing member 41 and which project from the cup bottom wall 43 towards the bottom wall 9 of the housing 2. Of the three blocking levers in total only the two blocking levers 48 and 49 are shown in FIGS. 1, 4, 5, 6 and 7. As regards the manner in which the two blocking levers 48 and 49 are shown in FIGS. 5 to 7, it is to be borne in mind that for the clarity of the drawings only the blocking lever 48 is shown in its first intermediate position, its second intermediate position and its release position, respectively, whereas the blocking lever 49 is always shown in its blocking position, which does not correspond to the actual situation to be illustrated in the FIGS. 5, 6 and 7.

The blocking levers 48 and 49 are each pivotally connected to the cup bottom wall 43 of the bearing member 41 via an integral hinge 50 and 51, respectively. The blocking levers 48 and 49 each have a blocking stop 52 and 53, respectively, each of the blocking stops 52 and 53 having a V-shaped recess 54 and 55, respectively. When the blocking means 36 are in the blocking position shown in FIG. 4 each blocking stop 52 or 53 is disposed in a direction parallel to the reel axis 27 opposite a blocking ring 56 arranged in the area of the reel hub 18. The blocking ring 56 is wedge-shaped at its side 57 which faces the blocking levers 48 and 49, which shape corresponds to the recesses 54 and 55 of the blocking stops 52 and 53.

The three blocking levers, of which only the blocking levers 48 and 49 are shown in FIG. 1 and FIGS. 4 to 7, can be positioned in their blocking positions shown in FIG. 4 by means of an annular spring 58, which is substantially coaxial with the reel axis 27. For this purpose, each blocking lever 48 and 49 in the cassette 1 has an L-shaped portion which projects radially towards the reel axis 27 of the reel 17 and the annular spring 58 surrounds the limbs 61 and 62 of the L-shaped portions 59 and 60, which limbs extend substantially perpendicularly to the cup bottom wall 43 of the bearing member 41. In this way, it is achieved by simple means that the blocking levers 48 and 49 can be positioned reliably and accurately in their blocking positions.

In the cassette 1 shown in FIGS. 1 to 7 the free ends 63 and 64 of the limbs 61 and 62 of the L-shaped portions 59 and 60, which limbs extend transversely to the cup bottom wall 43 of the bearing member 41 are adapted to cooperate with the actuating device 37 for actuating the blocking levers 48 and 49. In the present case the free ends 63 and 64 are adapted to cooperate with the part 38 of the reel drive device 28, which part takes the form of a substantially cylindrical projection.

It is to be noted that the bearing member 41 and the two blocking levers 48 and 49 as well as the third blocking lever, not shown, and the L-shaped portions 59 and 60 of the two blocking levers 48 and 49 and the L-shaped portion, not shown, of the third blocking lever are formed by a single synthetic-resin part, which has proved to be advantageous for an extremely simple construction.

In the cassette 1, as is further apparent from FIGS. 1 and 4 to 7, a ring-like wall portion 65 of the reel hub 18 is connected to the hollow cylindrical wall portion 40 of the reel hub 18, which ring-like wall portion projects from the hollow cylindrical wall portion 40 towards the reel axis 27 of the reel 17 and which, despite some stepped portions and raised portions extends substantially parallel to the bottom wall 9, and a helical pressure spring, which forms the afore-mentioned spring 30 which urges the reel 17 towards the bottom wall 9, is arranged between the bearing member 41 and the reel 17 and at one end acts upon the cup bottom wall 43 of the bearing member 41 and at the other end upon the ring-like wall portion 65 of the reel hub 18.

In the cassette 1, as is further apparent from FIGS. 1 and 4 to 7, the blocking ring 56, which is adapted to cooperate with the blocking stops 52 and 53 of the blocking lever 48, is connected to the ring-like wall portion 65 of the blocking ring 56 in the inner area of the ring-like wall portion 65 of the reel hub 18.

As long as a cassette 1 in accordance smith the invention, as shown in FIGS. 1 to 7, is situated outside an apparatus adapted to cooperate with this cassette 1, the reel 17 accommodated in the cassette 1 is in its rest position shown in FIGS. 1 to 4, in which position the latching means 29 ensure that the reel 17 is locked against rotation about the reel axis 27.

When the cassette 1 is loaded into an apparatus adapted to cooperate with the cassette 1 such a loading operation produces a relative movement between the cassette 1 and the drive device 28. This can be achieved in that the cassette 1 is moved towards the drive device 28 or in that the drive device 28 is moved towards the cassette 1. In each of these cases the reel 17 drive device 28 enters into operational engagement with the reel hub 18 of the reel through the passage 16 in the bottom wall 9 of the cassette 1. The free ends 63 and 64 of the L-shaped portions 59 and 60 of the blocking levers 48 and 49 then first engage with tape 39 of the part 38 of the reel drive device 28, as can be seen in FIG. 5. As a result of this, the blocking levers 48 and 49 are pivoted away from the reel axis 27, during which pivotal movement these levers 48 and 49 assume the first intermediate position shown in FIG. 5 and subsequently assume the second intermediate position shown in FIG. 6.

In the second intermediate position of the blocking levers 48 and 49, shown in FIG. 6, the reel 17 is still in its rest position, in which it is locked against rotation with the aid of the latching means 29. In the second intermediate position shown in FIG. 6 the ring-like wall portion 65 of the reel hub 18 already engages wholly with the reel drive device 28. Thus, it is achieved that drive teeth 66 provided on the reel drive device 28 and shown only diagrammatically in FIGS. 4 to 7 are in mesh with corresponding teeth 67 provided in the area of the ring-like wall portion 65 of the reel hub 18, so that it is guaranteed that the reel 17 is rotationally drivable by means of the reel drive device 28.

Subsequently, the reel drive device 28 moves the reel 17 away from the bottom wall 9 of the housing 2 of the cassette 1 in a direction parallel to the reel axis 27, i.e. into the drive position of the reel 17 shown in FIG. 7, in which the latching teeth 31, 32, 33 and 34 are not in mesh with the latching teeth 35, which is not visible in FIG. 7 but which evident in view of the distance of the lower first reel flange 19 from the bottom wall 9 of the housing 2. The reel 17 can now be rotationally driven by means of the reel drive device 28.

In the cassette 1 in accordance with the invention described hereinbefore it is achieved in a constructionally very simple as well as very economical manner that an unintentional or inadvertent or inappropriate movement or actuation of the latching means 29 is wholly excluded because the latching means 29 are arranged and constructed in such a manner that they are disposed completely inside the housing 2 of the cassette 1. As a result of the above-described construction and arrangement of the blocking means 37 formed by three blocking levers an unintentional movement of the reel 17 from its rest position into its drive position and, consequently, an unintentional deactivation of the latching means 29 is excluded in a highly reliable manner because all three blocking levers should be moved simultaneously from their blocking positions into their release positions to allow a movement of the reel 17 from its rest position into its drive position. Such a simultaneous movement of all three blocking levers is practically only possible with the aid of suitably constructed actuating means and is very difficult to achieve in an unintentional or inappropriate manner.

The invention is not limited to the embodiment described hereinbefore by way of example. For example, it is also possible to provide more than three blocking levers. Furthermore, the blocking levers can be constructed without L-shaped portions and cooperate directly with actuating means via their free ends. Moreover, the measures in accordance with the invention are not limited to a cassette having only one reel but can also be applied to a magnetic-tape cassette having two juxtaposed reels.

I claim:

1. A cassette comprising:

a housing having a bottom wall having a passage therethrough, at least one reel accommodated in the housing and having a hub, a reel flange, and a reel axis extending perpendicularly to the bottom wall, said reel being movable in an axial direction parallel to the reel axis between a rest position and a drive position in which the reel is drivable by a reel drive device which can be brought through said passage in a direction parallel to the axial direction into driving engagement with the reel, a spring arranged to urge the reel toward the bottom wall and, in the absence of a reel drive device bringing the reel into the drive position, hold the reel in the rest position, and latching means, responsive to the reel being in the rest position, for locking the reel against rotation about the reel axis relative to the housing, in the drive position the latching means being inoperative, characterized in that the latching means is arranged inside the housing at a location which is inaccessible from outside the cassette, and the cassette further comprises blocking means arranged inside the housing adjacent the reel hub and the passage, movable with respect to the housing between a blocking position for preventing movement of the reel in the axial direction from the rest position to the drive position, and a release position for permitting movement of the reel from the rest position to the drive position.

2. A cassette as claimed in claim 1, characterized in that the housing further comprises additional walls, and the latching means comprises at least one tooth projecting from at least one wall of the housing adjacent the bottom wall, and latching teeth on the reel.

3. A cassette as claimed in claim 1, characterized in that the reel hub has a hollow cylindrical wall defining a space open toward said passage, and the blocking means is arranged inside said hollow cylindrical wall portion.

4. A cassette (1) as claimed in claim 3, characterized in that a cup-like bearing member (41) for the reel (17) is arranged inside the hollow cylindrical wall portion (40) of the reel hub (18), which bearing member has a circumferential cup wall (42) which engages with the hollow cylindrical wall portion (40) of the reel hub (18) and a cup bottom wall (43) which is disposed adjacent the upper wall (10) of the housing (2), a pivotal bearing device (44) for rotatably supporting the reel (17) being interposed between the upper wall (10) of the housing (2) and the cup bottom wall (43) of the bearing member (41) and the hollow cylindrical wall portion (40) of the reel hub (18) being movable with respect to the circumferential cup wall (42) of the bearing member (41) in a direction parallel to the reel axis (27), and the blocking means (36) comprise at least one blocking lever (48, 49) which is pivotally connected to the cup bottom wall (43) of the bearing member (41) and which projects from the cup bottom wall (43) towards the bottom wall (9) of the housing (2), which at least one blocking lever has a blocking stop (52, 53) which, when the blocking means (36) are in their blocking position, is disposed in a direction parallel to the reel axis (27) opposite a blocking ring (56) arranged on the reel (17) in the area of its reel hub (18).

5. A cassette (1) as claimed in claim 4, characterized in that the blocking means (36) comprise at least three blocking levers (48, 49) which are pivotally connected to the cup bottom wall (43) and which can be positioned into their blocking positions by means of an annular spring (58) which is substantially coaxial with the reel axis (27).

6. A cassette (1) as claimed in claim 5, characterized in that each blocking lever (48, 49) has an L-shaped portion (59, 60) which projects substantially radially towards the reel axis (27) of the reel (17) and the annular spring (58) surrounds those limbs (61, 62) of the L-shaped portions (59, 60) which extend substantially perpendicularly to the cup bottom wall (43) of the bearing member (41).

7. A cassette (1) as claimed in claim 6, characterized in that the free ends (63, 64) of those limbs (61, 62) of the L-shaped portions (59, 60) which extend substantially perpendicularly to the cup bottom wall (43) of the bearing member (41) are adapted to cooperate with an actuating device (37) for actuating the blocking levers (48, 49).

8. A cassette (1) as claimed in claim 7, characterized in that the bearing member (41) and the blocking levers (48, 49) and the L-shaped portions (59, 60) of the blocking levers (48, 49) are formed by a single synthetic-resin part and the blocking levers (48, 49) are each pivotally connected to the cup bottom wall (43) of the bearing member (41) via an integral hinge (50, 51).

9. A cassette (1) as claimed in claim 4, characterized in that a ring-like wall portion (65) of the reel hub (18) is connected to the hollow cylindrical wall portion (40) of the reel hub (18), which ring-like wall portion (65) projects from the hollow cylindrical wall portion (40) towards the reel axis (27) of the reel (17), is disposed adjacent the bottom wall (9) of the housing (2) and extends substantially parallel to this bottom wall (9), and a helical pressure spring (30) is arranged between the bearing member (41) and the reel (17) and acts at one end upon the cup bottom wall (43) of the bearing member (41) and at the other end upon the ring-like wall portion (65) of the reel hub (18).

10. A cassette (1) as claimed in claim 9, characterized in that the blocking ring (56), which is adapted to cooperate with the blocking stop (52, 53) of a blocking lever (48, 49), is connected to the ring-like wall portion (65) of the blocking ring (56) in the inner area of the ring-like wall portion (65) of the reel hub (18).

11. A cassette as claimed in claim 3, characterized in that the blocking means is arranged to be movable by an actuating device formed by a part of the reel drive device.

12. A cassette as claimed in claim 1, characterized in that the blocking means comprises a release engagement surface which is movable in a direction perpendicular to the axial direction for moving the blocking means from the blocking position to the release position.

* * * * *